Figure 1:
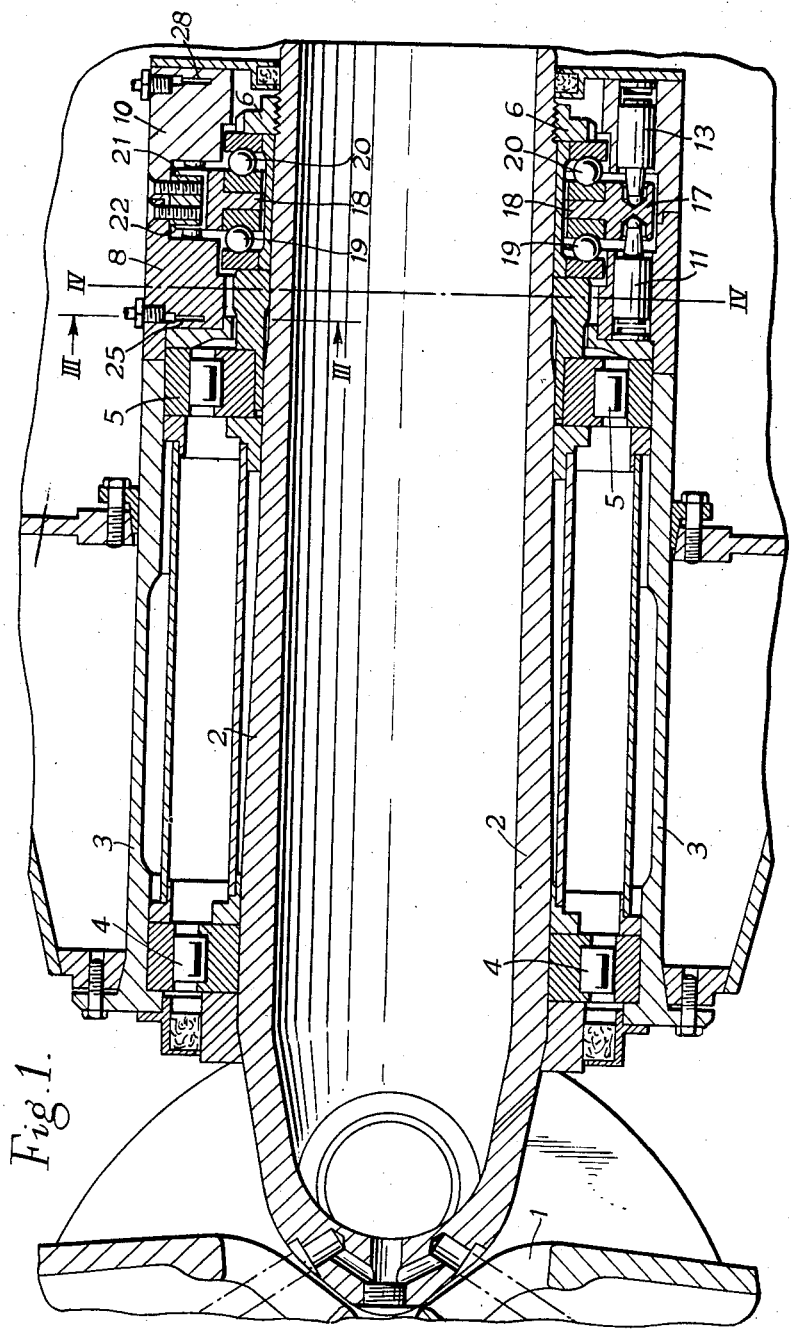

Dec. 23, 1958     R. J. PERDUE     2,865,459
ANEMO-ELECTRIC POWER PLANT
Filed March 15, 1954     6 Sheets-Sheet 1

INVENTOR
Robert John Perdue
BY

ATTORNEY

Dec. 23, 1958  R. J. PERDUE  2,865,459
ANEMO-ELECTRIC POWER PLANT
Filed March 15, 1954   6 Sheets-Sheet 2

INVENTOR
Robert John Perdue
BY

ATTORNEY

Dec. 23, 1958  R. J. PERDUE  2,865,459
ANEMO-ELECTRIC POWER PLANT
Filed March 15, 1954  6 Sheets-Sheet 3
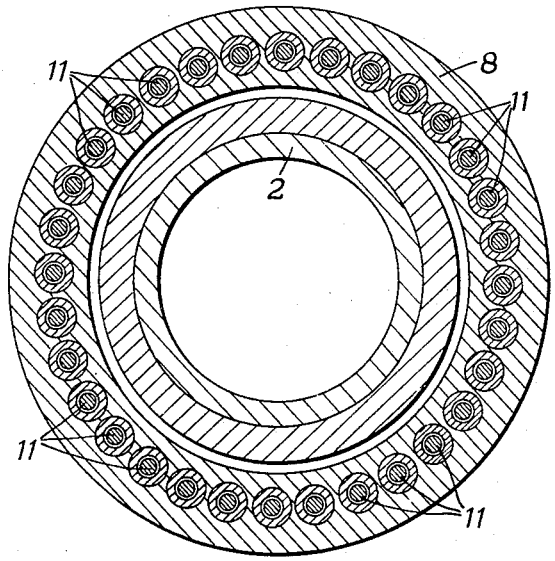
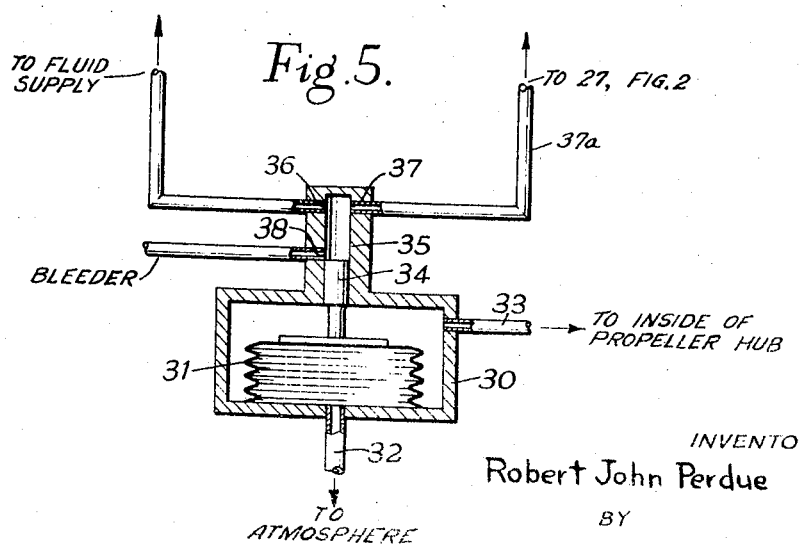
INVENTOR
Robert John Perdue
BY
ATTORNEY

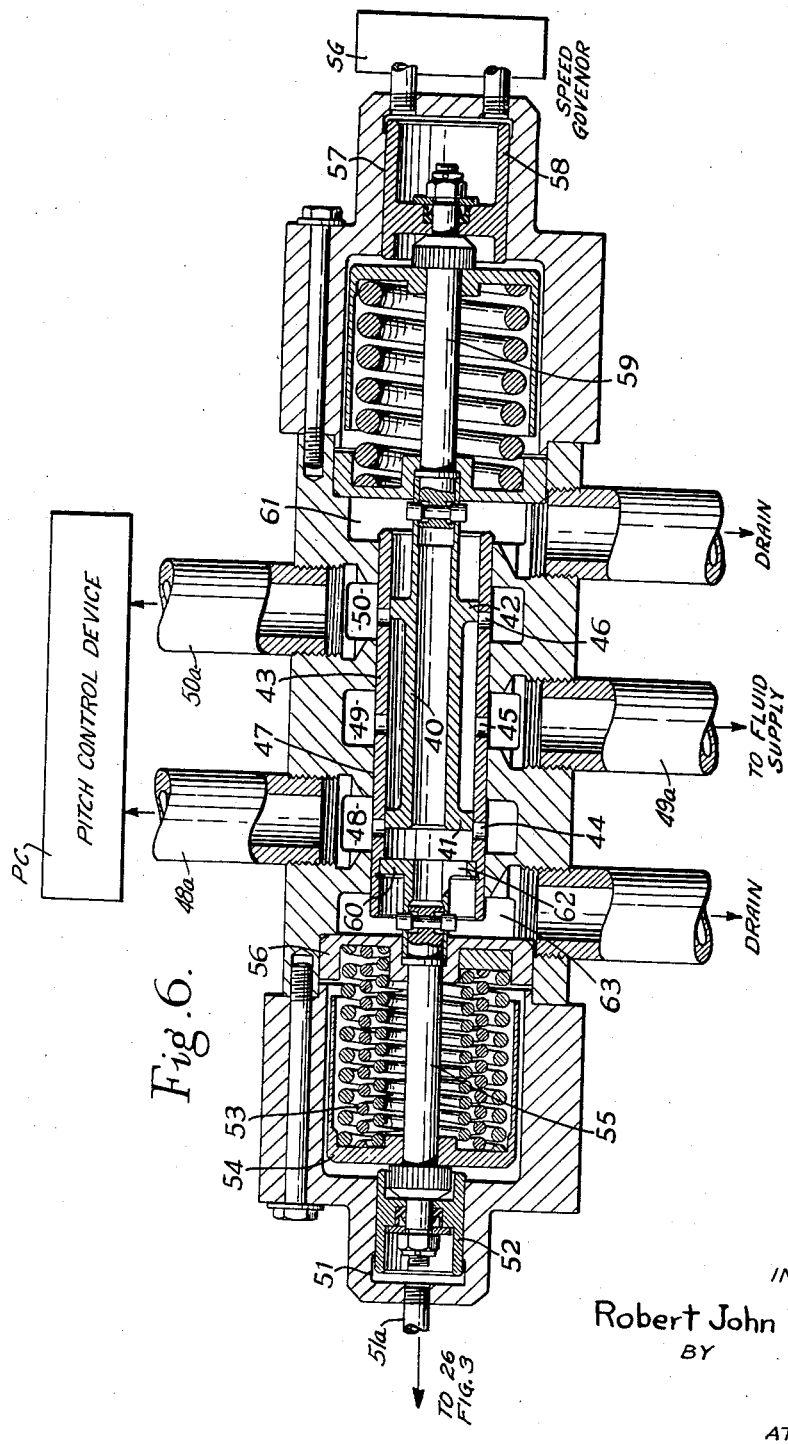

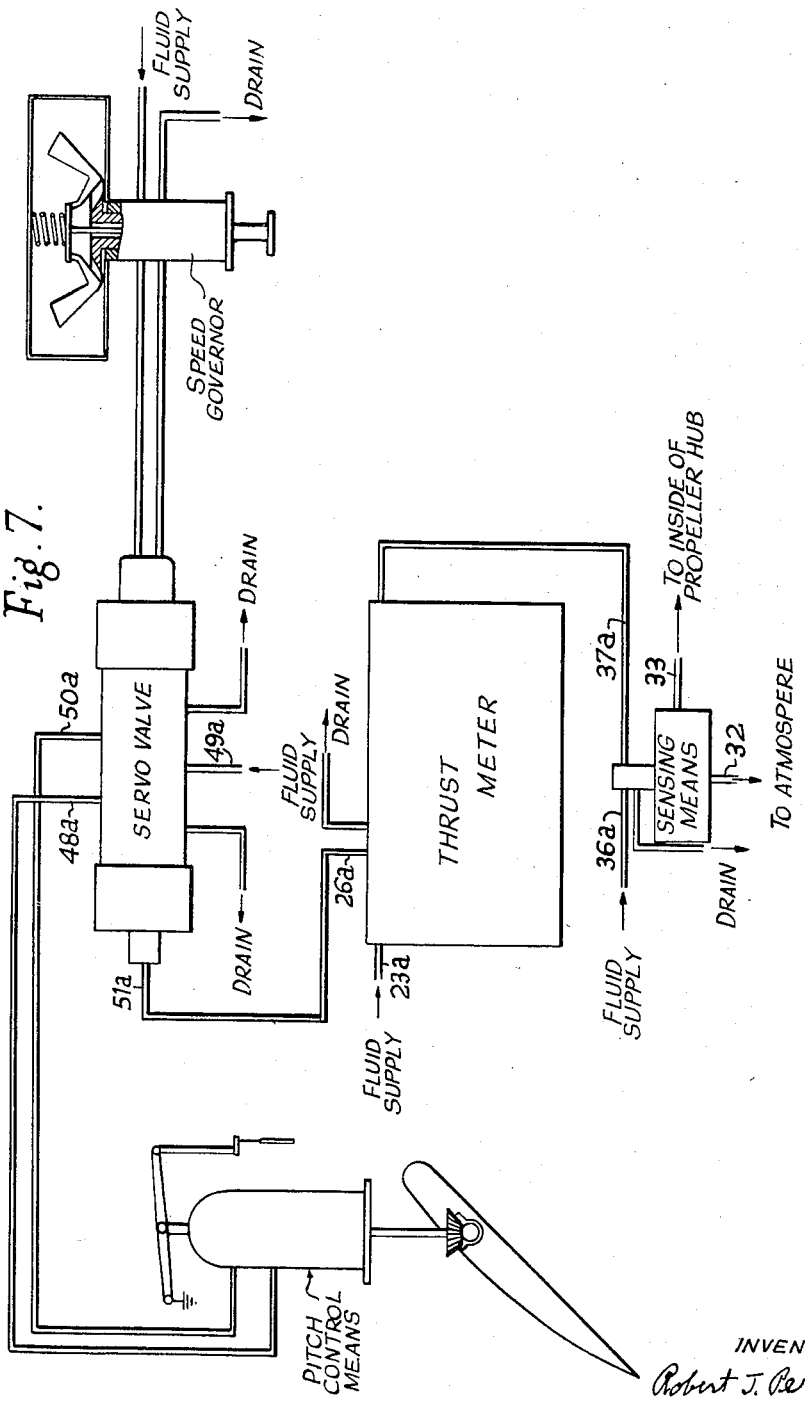

Dec. 23, 1958

R. J. PERDUE 2,865,459

ANEMO-ELECTRIC POWER PLANT

Filed March 15, 1954

6 Sheets—Sheet 6

INVENTOR
Robert J. Perdue
BY
Ralph B. Stewart
ATTORNEY

United States Patent Office 2,865,459
Patented Dec. 23, 1958

2,865,459
ANEMO-ELECTRIC POWER PLANT

Robert John Perdue, Potters Bar, England, assignor to De Havilland Propellers Limited, Hatfield, England Application March 15, 1954, Serial No. 416,320

Claims priority, application Great Britain March 17, 1953

4 Claims. (Cl. 170—62)

The present invention relates to anemo-electric power plants which utilises the effect exerted by the wind upon the blades of a propeller, to cause rotation of the said propeller, and thereby to generate electric power.

The invention relates more particularly to power plants of the kind which are operated on the so-called depression principle. In this kind of power plant the blades of the propeller are hollow and are provided with apertures at their tips. The interior of each blade communicates, via an air-tight passage through its root and through the hub of the propeller, with the outlet of an air turbine which is coupled to an electric generator. When the wind velocity is of a value sufficient to cause rotation of the propeller, the air within the hollow blades is induced, by reason of the centrifugal force generated by its own mass, to flow out through the said apertures in the blade tips, thereby forming a depression i. e. a pressure lower than that of the surrounding atmosphere, within the hollow blades. The air within the air-tight passages and the air turbine is then at a higher pressure than that of the air remaining within the blades and there is therefore established a continuous flow of air through the air turbine, the air-tight passages, the interiors of the blades and out through the said apertures. The flow of air through the air turbine supplies the power to drive the electric generator.

The object of the invention is to provide an anemo-electric power plant operating on the depression principle, in which the thrust exerted on the supporting structure due to the action of the wind upon the propeller remains substantially constant over the operative range of wind velocities above the rated windspeed.

In the improved power plant of the invention the pitch angle of the blades of the propeller are adjustable in response to the axial thrust exerted on the supporting structure due to the action of the wind on the propeller, and it is essential for the performance of the present invention that means be employed for accurately determining this thrust. In an anemo-electric power plant operated on the depression principle, however, the supporting structure is subjected to two axial forces, one axial force arising from the effect of the wind acting directly on the blades of the propeller and another axial force arising from the difference in pressure between the pressure of air within the hub of the propeller and the pressure of the surrounding atmosphere. The said other axial force acts in opposition to the said one axial force in the preferred arrangement of power plant in which the propeller is mounted on the leeward side of the supporting structure, and it is a feature of the invention that sensing means is provided for determining the said pressure difference and utilizing this pressure difference to determine the said other axial force.

Figure 2:
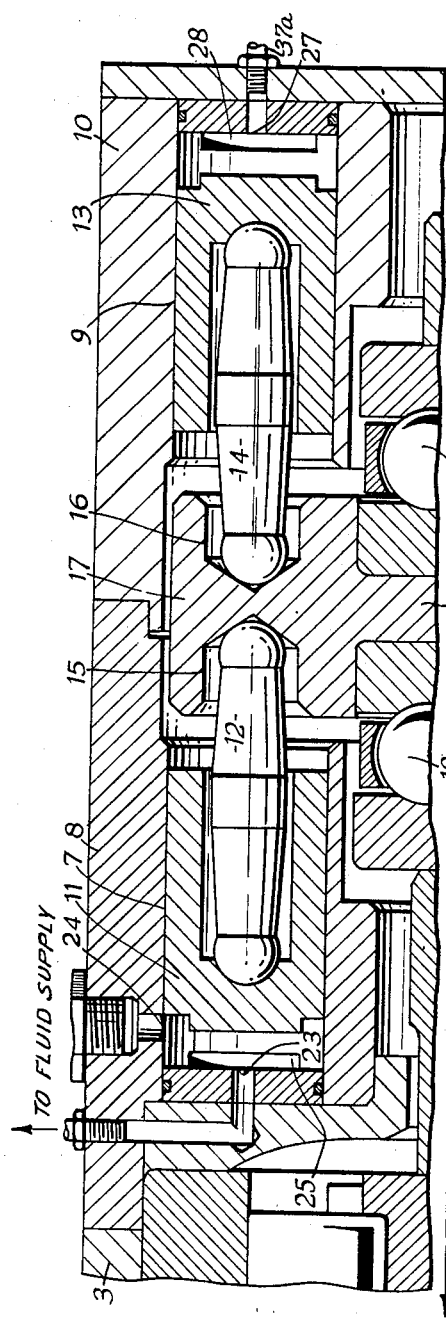
Figure 3:
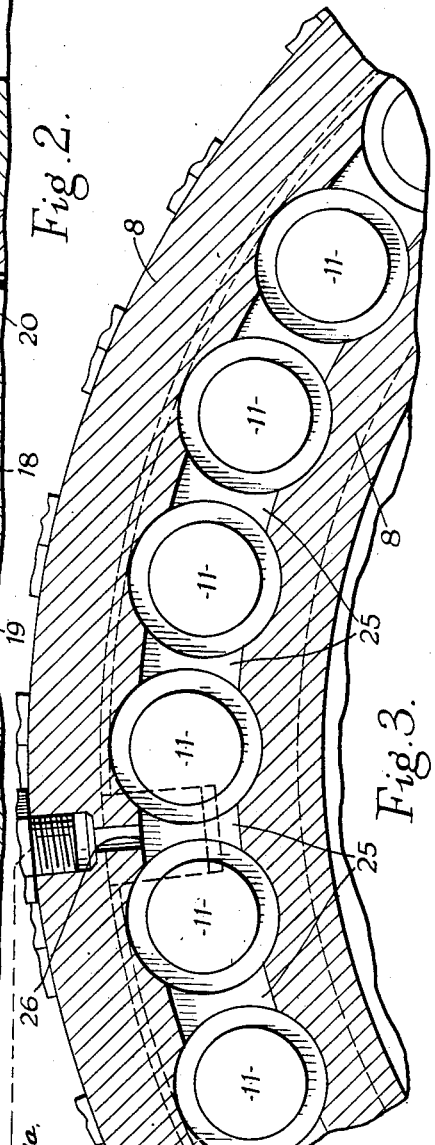
Figure 8:
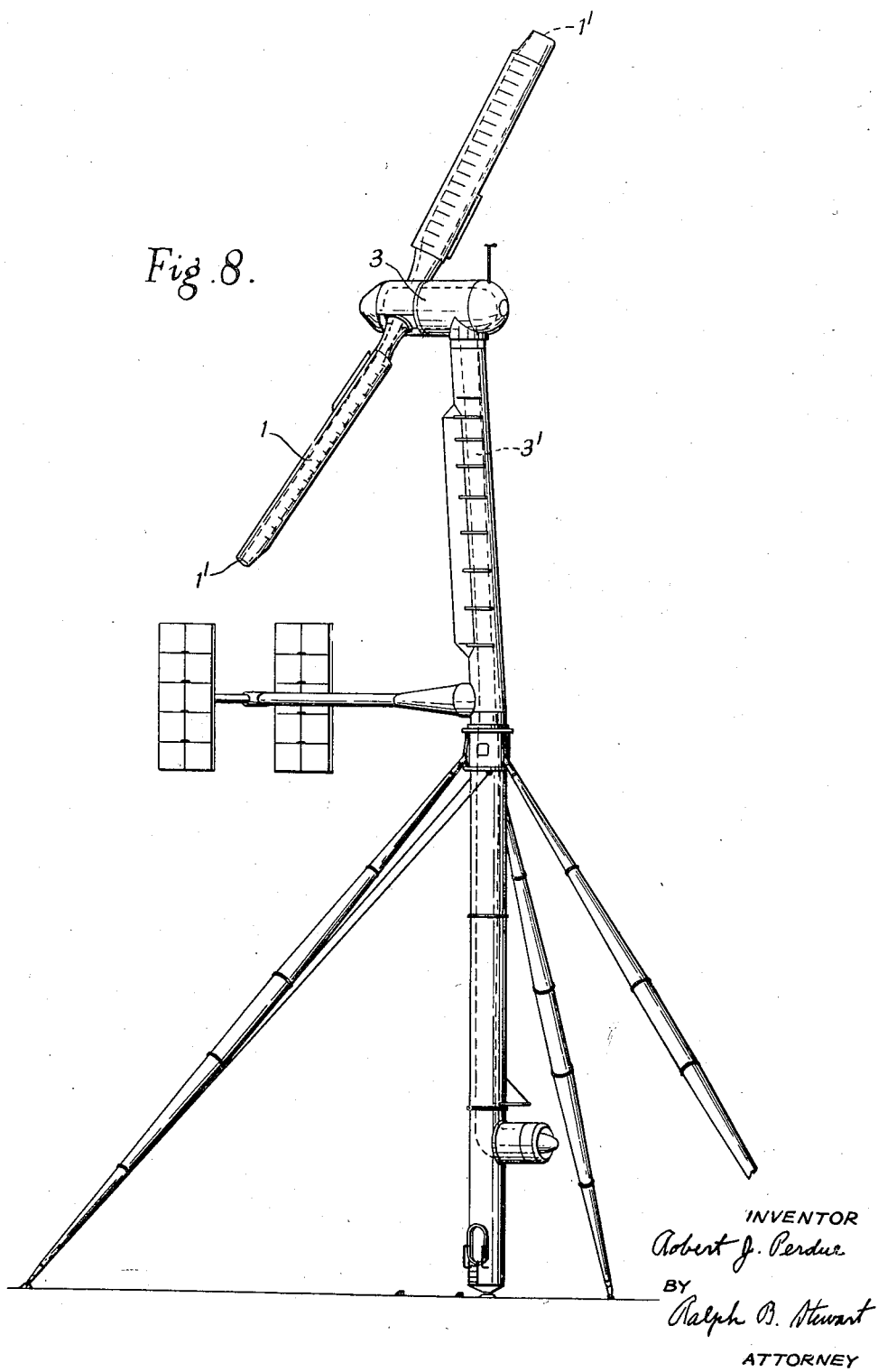

An anemo-electric power plant operated on the depression principle and embodying the features of the invention will now be described by way of example with reference to the accompanying drawings in which:

Fig. 1 is a sectional view of the axle shaft, thrust meter assembly, and part of the supporting structure, Fig. 2 is a sectional view of a detail of the thrust meter assembly, Fig. 3 is a view along the line III—III of Fig. 1, Fig. 4 is a view at line IV—IV of Fig. 1, Fig. 5 is a diagrammatic representation of sensing means for determining the pressure differential between the air in the hub and the atmospheric air, Fig. 6 is a sectional view of the servo valve, Fig. 7 is a diagrammatic representation of the thrust meter assembly, sensing means, servo valve, pitch change means, and the interconnecting fluid conduits, Fig. 8 is an elevation view of the propeller and supporting structure.

The anemo-electric power plant comprises a hollow bladed propeller 1 mounted on the leeward side of a supporting structure 3. The blades of the propeller are provided with apertures 1' at their tips and the interior of each blade communicates, via an air-tight passageway 3' through the hub of the propeller, with the outlet of an air turbine which is coupled to an electric generator. The pitch of the blades of the propeller are adjustable by pitch change means which are mounted within the propeller hub and which are operated by control means including a thrust meter assembly, sensing means, and a servo valve mounted within a cylindrical head on the supporting structure.

The hub of the propeller is secured to a hollow axle shaft 2 which is supported inside the head of the supporting structure by two sets of roller bearings 4, 5. The outer surface of the axle shaft 2 adjacent its rear end, that is the end remote from the propeller 1, is screw-threaded for the reception of a lock nut 6.

The thrust meter assembly comprises an annular series of front cylinders 7 formed in an annular cylinder block 8 secured to the supporting structure 3 and an annular series of rear cylinders 9 formed in an annular cylinder block 10 also secured to the supporting structure 3. Each cylinder 7 is provided with a piston 11 and a rearwardly extending piston rod 12, and each cylinder 9 is provided with a piston 13 and a forwardly extending piston rod 14. The piston rods 12 and 14 engage against the heads of recesses 15 and 16 formed in opposite faces of an annular thrust block 17 interposed between the cylinders 7 and 9. The thrust block 17 is provided with an inwardly extending flange 18 interposed between two thrust bearings 19 and 20 positioned between the roller bearing 5 and the lock nut 6. The thrust block 17 together with the pistons 11, 13, the thrust bearings 19, 20, the inner races of the roller bearings 4, 5, the lock nut 6 and the axle shaft 2 is capable of limited axial movement relative to the supporting structure 3, cylinder blocks 8, 10 and the outer races of the roller bearings 4, 5, but rotational movement of the thrust block 17 is prevented by a key 21 rigidly secured to the cylinder block 10 and positioned within a radial slot 22 formed in the outer periphery of the thrust block 17 and extending parallel to the axis of said block 17.

The forward end of each of the cylinders 7 is blanked off and provided with a fluid supply orifice 23, and the wall of each cylinder 7 adjacent its forward end is provided with bleed orifice 24. The forward ends of each of the cylinders 7 are in communication with each other by an annular slot 25 formed in the cylinder block 8 and interconnecting adjacent cylinders, and one of the said slots 25 is provided with a pressure communicating orifice 26. The forward ends of the cylinders 7, the crowns of the pistons 11 and the slots 25 thus form a fluid chamber provided with fluid supply orifices 23, a fluid communicating orifice 26 and fluid bleed orifices 24, the bleed orifices 24 being positioned to the rear of the orifices 23 and 26.

The rear end of each of the cylinders 9 is blanked off and provided with an orifice 27, and the cylinders 9 are in communication with each other by an annular slot 28 formed in the cylinder block 10 and interconnecting adjacent cylinders.

When the wind acts upon the blades of the propeller to produce an axial thrust in the forward direction, the thrust is transmitted to the pistons 11 through the axle shaft 2, the lock nut 6, the rear thrust bearing 20, the thrust block 17 and the piston rods 12. The forward ends of the pistons 11 bear against the fluid enclosed within the said fluid chamber. The fluid is forced into the fluid chamber, from a suitable source of supply under pressure, through a conduit 23a and the fluid supply orifices 23 which are of smaller cross-sectional area than that of the bleed orifices 24. The fluid pressure within the fluid chamber remains at a low value until the pistons 11 in their forward movement under the action of the axial thrust commence to move across and thereby reduce the cross-sectional area of the bleed orifices 24, whereupon the fluid pressure in the fluid chamber will rise to the proportion of the supply pressure necessary to prevent further forward movement of the pistons 11. The pistons 11 and bleed orifices 24 are of course similarly disposed within their respective cylinders so that the cross-sectional areas of the individual orifices 24 left uncovered by the pistons 11 are equal in all positions of the thrust block 17.

The pressure of fluid in the fluid chamber is communicated through the said pressure communicating orifices 26 and conduit 26a with a servo operated control valve of Figure 6 which regulates the supply of fluid to pitch change means.

The sensing means for sensing the pressure difference between the air in the hub and atmospheric air is illustrated diagrammatically in Fig. 5 and comprises a chamber 30 having a pressure-responsive capsule 31, the interior of the capsule 31 communicating through a conduit 32 with air at atmospheric pressure and the interior of the chamber 30 communicating through a conduit 33 with the air within the propeller hub. A metering piston 34, rigidly secured to the capsule 31, is adapted for linear movement within a metering cylinder 35 in response to linear movement of the said capsule. The cylinder 35 is provided with three orifices, namely a fluid supply orifice 36 and a pressure communicating orifice 37 located at the head of the cylinder 35, and a bleed orifice 38 located in such a position that linear movement of the piston 34 due to an expansion of the capsule 31 reduces the cross-sectional area of the said bleed orifice 38. Fluid is forced into the cylinder 35, from a suitable source of supply under pressure, through the orifice 36 which is of a smaller cross-sectional area than that of the orifice 38. The fluid pressure within the cylinder 35 remains at a low value until the piston 34 moves inwards due to a difference in pressure across the capsule, and commences to move across and thereby reduce the cross-sectional area of the orifice 38. The fluid pressure within the cylinder 35 then rises to the proportion of the supply pressure necessary to prevent further inward movement of the piston 34 by imparting to the capsule 31 through the piston 34 the force necessary to counterbalance the forces acting on each side of the capsule 31. This fluid pressure within the cylinder 35 is communicated, through the orifice 37, and connection 37a to the orifices 27 in the thrust meter assembly (Fig. 2), to fluid enclosed within the rear portions of the cylinder 13, thereby imparting to the thrust block 17, a forward thrust corresponding to the rearward thrust imparted to the propeller hub due to the difference between the pressure in the hub and the pressure of the surrounding air.

The servo valve is shown in Fig. 6 and comprises a central control piston 40, the external surface of which is provided with a flange 41 at its forward end, that is the left hand end as shown in Fig. 6, and a similar flange 42 adjacent its rear end. The piston 40 is located within a control sleeve 43 provided with three axially spaced annular series of apertures 44, 45 and 46, the apertures 44 and 46 being of a size and being positioned such that the two flanges 41, 42, which are in sliding contact with the internal surface of the sleeve 43, can blank them off in one position of adjustment of the piston 40 relative to the sleeve 43. The sleeve 43 is positioned for sliding movement within a cylinder 47 centrally located in the body of the valve and this cylinder 47 is provided with three axially spaced annular recesses 48, 49 and 50, each co-operating with one of the series of apertures 44, 45 and 46 in the sleeve 43. The forward and rear annular recesses 48 and 50 are in communication, through ports in the last-mentioned recesses and through conduits 48a and 50a, with the pitch control means represented at PC, fluid supplied through the recess 48 increasing the pitch angle of the blades and fluid supplied through the recess 50 decreasing the pitch angle of the blades. The intermediate recess 49 is in communication with a supply of fluid under pressure by way of conduit 49a. The forward end of the valve body is provided with a thrust control cylinder 51 for co-operation with a thrust control piston 52 biased into its forward position by helical springs 53 compressed between a retaining member 54 secured to the rod 55 of the piston 52 and a further retaining member 56 located in a recess in the valve body. The rear end of the valve body is provided with a speed control cylinder 57 having a piston 58 and a piston rod 59 biased in the rearward direction in a similar manner to that by which the piston 52 is biased in the forward direction. The piston rod 55 is provided with a flange member 60 located in a recess in the sleeve 43 and the piston rod 59 acts directly on the rearward end of the piston 40. A suitable pitch control device for use at PC is shown in British Patent 505,077.

The cylinder 51 is in communication with the orifice 26 of the thrust governing meter by way of conduit 51a and on increase in axial thrust on the propeller the pressure of the fluid in the cylinder 51 increases, thus driving the piston 52 to the rear, against the action of the springs 53. The piston 52 in its rearward travel, drives the sleeve 43 to the rear and consequently positions the apertures 44, 46 to the rear of the flanges 41, 42 of the piston 40 respectively, establishing a communication path between the recess 48 and the fluid supply via the recess 49, the apertures 45 in the sleeve 43, the region between the flanges 41 and 42 of the piston 40 and the apertures 44. The supply of fluid to the recess 48, and thence to the associated port and conduit 48a, operates the pitch control means to increase the pitch angle of the blades and thereby reduce the axial thrust exerted by the wind on the blades. A reduction in the axial thrust will similarly allow the sleeve 43 to move forward, positioning the apertures 44, 46 to the front of the flanges 41, 42 respectively, and establishing communication between the recess 50 and the fluid supply. When a quantity of fluid is supplied to the pitch control means through the recess 48, a similar quantity of fluid is forced out of the recess 50 and through the apertures 46 which under these circumstances are positioned to the rear of the flange 42 and this excess fluid is drained away through an orifice communicating with a recess 61 located in the valve body at the rear end of the sleeve 43. Similarly, any excess fluid ejected from the recess 48 when the apertures 44 are positioned to the front of the flange 41 is drained away through an orifice 62 in the member 60 and a recess 63 located in the valve body at the forward end of the control sleeve.

The piston 58 is operated by a speed governor, of suitable construction represented at SG, which supplies fluid under pressure to the cylinder 57 whenever the speed of the propeller rises above a predetermined value. In such circumstances the pressure of fluid in the cylinder 57 drives the piston 58, and the piston 40, in the forward direction, positioning the flange 41 to the front of the apertures 44 and effecting communication between the recess 48 and the fluid supply, thus supplying fluid to the pitch control means in order to increase the pitch angle of the blades and consequently decrease the speed of the propeller. The speed control mechanism only acts as a safety device for controlling the speed of the propeller in conditions of very high windspeeds. A suitable form of speed governor is shown in British Patent 470,284.

I claim:

1. An anemo-electric power plant operating on the depression principle and comprising a supporting structure, a propeller shaft rotatably mounted in the supporting structure, a hollowed bladed propeller having apertures in the tips of the blades, said supporting structure having an airtight passageway effecting communication between the interior of the blades and the outlet of an air turbine mounted on said supporting structure, pitch change means operable by fluid pressure for adjusting the pitch angle of the blades, and control means for actuating said pitch change means in response to variations of the axial thrust acting on said propeller, the said control means comprising axial thrust measuring means including a thrust block resisting the axial thrust acting on said propeller shaft due to the effect of the wind on the propeller, sensing means for determining the difference between the pressure existing within the said airtight passageway and the pressure of the surrounding atmosphere, compensating means controlled by said sensing means and subjecting said thrust block to a thrust proportional to said difference in pressure, and a valve system controlled by said axial thrust measuring means and regulating the supply of fluid to the said pitch change means in response to the thrust acting on said thrust block.

2. An anemo-electric power plant operating on the depression principle and comprising a supporting structure, a propeller shaft rotatably mounted in the supporting structure and provided with a small degree of axial freedom permitting longitudinal movement of the shaft within the supporting structure, a hollow bladed propeller having apertures in the tips of the blades, said supporting structure having an airtight passageway effecting communication between the interior of the blades and the outlet of an air turbine mounted on said supporting structure, a thrust block coupled to said propeller shaft for axial movement therewith, a first fluid chamber positioned on one side of the block and resisting the axial thrust acting on the block and the propeller shaft due to the effect of the wind on the propeller, means for supplying fluid under pressure to the said first chamber, and means responsive to variations in the longitudinal position of the thrust block for varying the discharge of fluid from said first chamber, a second fluid chamber positioned on the other side of said block, sensing means determining the difference between the pressure existing within said airtight passageway and the pressure of the surrounding atmosphere, compensating means controlled by said sensing means and supplying said second fluid chamber with fluid at a pressure proportional in value to said difference in pressure, the pressure of fluid in the second chamber exerting an additional axial thrust on the thrust block, pitch change means operable by fluid pressure for adjusting the pitch angle of the blades, and a valve system operable by the pressure of fluid in the said first fluid chamber for controlling the supply of fluid to the pitch change means.

3. A power plant as set forth in claim 2 wherein said compensating means comprises a metering chamber, a member within said metering chamber and displaceable in response to variations in the difference between the pressure of air within said airtight passageway and the pressure of the atmospheric air, means for supplying fluid under pressure to said metering chamber, means responsive to displacement of said member for varying the discharge of fluid from said metering chamber, and means connecting said metering chamber with said second fluid chamber whereby the pressure of the fluid within the metering chamber is transmitted to the fluid within the second fluid chamber.

4. An anemo-electric power plant as set forth in claim 2 wherein said valve system includes a valve chamber having inlet and outlet orifices in communication with the pitch change means, an element in said valve chamber longitudinally displaceable in response to variations in pressure within said first fluid chamber, a further element in said valve chamber longitudinally displaceable in response to variations in the speed of the propeller, and means for supplying fluid under pressure to said valve chamber, one of said elements cooperating with said orifices to control the supply of fluid to said pitch control means and the other of said elements cooperating with the said one element to modify the control of fluid supply to the pitch control means exercised by said one element.

References Cited in the file of this patent

UNITED STATES PATENTS

| 1,272,041 | Herr | July 9, 1918 |
| 1,421,208 | Gauldie | June 27, 1922 |
| 2,279,301 | Colley et al. | Apr. 14, 1942 |
| 2,281,871 | Corby | May 5, 1942 |
| 2,321,381 | Hammond | June 8, 1943 |
| 2,485,543 | Andreau | Oct. 25, 1949 |
| 2,517,038 | Sheffield | Aug. 1, 1950 |
| 2,629,450 | Fumagalli | Feb. 24, 1953 |

FOREIGN PATENTS

| 878,544 | France | Jan. 22, 1943 |